(12) United States Patent
Kato et al.

(10) Patent No.: US 9,470,219 B2
(45) Date of Patent: Oct. 18, 2016

(54) ELECTRIC PUMP

(71) Applicant: AISIN SEIKI KABUSHIKI KAISHA, Kariya-shi (JP)

(72) Inventors: Hiroshi Kato, Okazaki (JP); Hideki Nakayoshi, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 391 days.

(21) Appl. No.: 13/686,354

(22) Filed: Nov. 27, 2012

(65) Prior Publication Data

US 2013/0136586 A1 May 30, 2013

(30) Foreign Application Priority Data

Nov. 30, 2011 (JP) .................. 2011-262500

(51) Int. Cl.
| | |
|---|---|
| *F04B 39/12* | (2006.01) |
| *F04D 13/06* | (2006.01) |
| *F04B 17/03* | (2006.01) |

(Continued)

(52) U.S. Cl.
CPC .......... *F04B 39/121* (2013.01); *F01C 21/007* (2013.01); *F01C 21/10* (2013.01); *F04B 17/03* (2013.01); *F04B 53/22* (2013.01); *F04C 15/0096* (2013.01); *F04C 29/047* (2013.01); *F04D 13/06* (2013.01); *H02K 5/08* (2013.01);
(Continued)

(58) Field of Classification Search
CPC ............. F04C 23/008; F04C 2240/40; F04C 2240/808; F04B 27/1036; F04B 27/1081; F04B 35/04; F04B 39/121; H02K 1/185

USPC ........... 417/321, 349, 355, 356, 373, 410.4, 417/423.7, 423.8, 423.14, 423.15
See application file for complete search history.

(56) References Cited

U.S. PATENT DOCUMENTS 5,564,909 A 10/1996 Rischen et al.
6,281,607 B1 8/2001 Petach et al.
(Continued)

FOREIGN PATENT DOCUMENTS

| JP | 2000-18173 A | 1/2000 |
|---|---|---|
| JP | 2001-327124 A | 11/2001 |
| JP | 2005-287240 A | 10/2005 |
| JP | 2005-337095 A | 12/2005 |
| JP | 2012-26309 A | 2/2012 |
| JP | 2012-061949 A | 3/2012 |

OTHER PUBLICATIONS

Extended European Search Report dated Mar. 22, 2013, issued by the European Patent Office in the corresponding European Application No. 12194408.6. (6 pages).
(Continued)

*Primary Examiner* — Patrick Hamo
(74) *Attorney, Agent, or Firm* — Buchanan Ingersoll & Rooney PC (57) ABSTRACT

An electric pump includes a pump portion, a motor portion including a rotor formed in a cylinder form sharing an axis with a rotation shaft provided at the pump portion and a stator formed in an annular form arranged at an outer periphery of the rotor with a clearance between the stator and the rotor, and a driver portion arranged at a position between the pump portion and the motor portion when viewed in a direction orthogonal to an axial direction of the rotation shaft, the driver portion controlling the motor portion, the driver portion arranged in a state where a portion of the driver portion overlaps with at least a portion of the pump portion or with at least a portion of the motor portion when viewed in the axial direction.

9 Claims, 4 Drawing Sheets

(51) Int. Cl.
| | |
|---|---|
| *F04B 53/22* | (2006.01) |
| *H02K 5/08* | (2006.01) |
| *H02K 5/22* | (2006.01) |
| *H02K 7/14* | (2006.01) |
| *F01C 21/00* | (2006.01) |
| *F01C 21/10* | (2006.01) |
| *F04C 29/04* | (2006.01) |
| *F04C 15/00* | (2006.01) |
| *F04C 2/10* | (2006.01) |

(52) U.S. Cl.
CPC ............... *H02K 5/225* (2013.01); *H02K 7/14* (2013.01); *H02K 11/33* (2016.01); *F04C 2/102* (2013.01)

(56) References Cited

U.S. PATENT DOCUMENTS

| | | | |
|---|---|---|---|
| 7,015,605 | B1 | 3/2006 | Peter et al. |
| 2004/0109772 | A1* | 6/2004 | Ogawa et al. ............. 417/410.5 |
| 2005/0012387 | A1 | 1/2005 | Suzuki et al. |
| 2010/0008802 | A1* | 1/2010 | Morita ......................... 417/437 |

OTHER PUBLICATIONS

Official Action issued by the Japanese Patent Office in corresponding Japanese Patent Application No. 2011-262500 on Aug. 18, 2015, and English language translation of Official Action (6 pages).

* cited by examiner

FIG. 5

ELECTRIC PUMP

CROSS REFERENCE TO RELATED APPLICATIONS

This application is based on and claims priority under 35 U.S.C. §119 to Japanese Patent Application 2011-262500, filed on Nov. 30, 2011 the entire content of which is incorporated herein by reference.

TECHNICAL FIELD

This disclosure generally relates to an electric pump.

BACKGROUND DISCUSSION

A known electric pump including a fluid pump, an electric motor driving the fluid pump, and a driver controlling an electric current supply to the electric motor being integrally formed as a unit, is disclosed in JP2005-337095A, hereinafter referred to as Reference 1.

More specifically, an electric pump disclosed in Reference 1 includes a pump portion discharging an operating oil and a motor for driving the pump portion. The pump portion and the motor are integrally formed as a unit. A stator of the motor is housed in a motor housing made of resin. A circuit board of a driver portion is fixed to the motor housing at a position in an opposite direction of where the pump portion is. A cover is attached to the motor housing such that the cover houses the driver portion. Accordingly, a space for containing the driver portion is formed by the motor housing and the cover.

In the electric pump disclosed in Reference 1, the driver portion is larger in size relative to the motor portion. As a result, a dead space is formed below the driver portion at an outward portion of the motor portion, a space incapable of an effective use. On an occasion where such electric pump is installed on an engine, the electric pump projects out from the engine, which makes allocation of a space for such electric pump in an engine room difficult.

A need thus exists for an electric pump, which is not susceptible to the drawback mentioned above.

SUMMARY

An electric pump includes a pump portion, a motor portion including a rotor formed in a cylinder form sharing an axis with a rotation shaft provided at the pump portion and a stator formed in an annular form arranged at an outer periphery of the rotor with a clearance between the stator and the rotor, and a driver portion arranged at a position between the pump portion and the motor portion when viewed in a direction orthogonal to an axial direction of the rotation shaft, the driver portion controlling the motor portion, the driver portion arranged in a state where a portion of the driver portion overlaps with at least a portion of the pump portion or with at least a portion of the motor portion when viewed in the axial direction.

An electric pump includes a pump portion connected to a first end of a rotation shaft, a motor portion including a rotor connected to a second end of the rotation shaft and a stator formed in an annular form arranged at an outer periphery of the rotor with a clearance between the stator and the rotor, and a driver portion arranged at a position between the pump portion and the motor portion in an axial direction of the rotation shaft, the driver portion controlling the motor portion. At least a portion of the driver portion is either arranged radially inward of the pump portion or radially inward of the motor portion in a radial direction of the rotation shaft.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
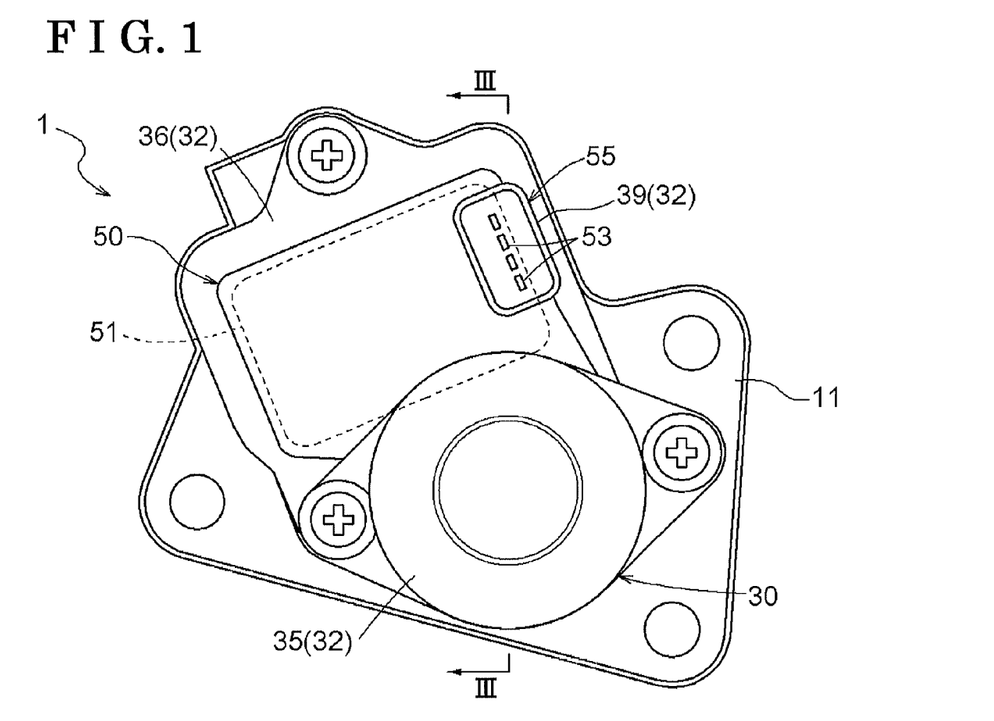
FIG. 1 is a top view of an electric pump according to a first embodiment.
Figure 2:
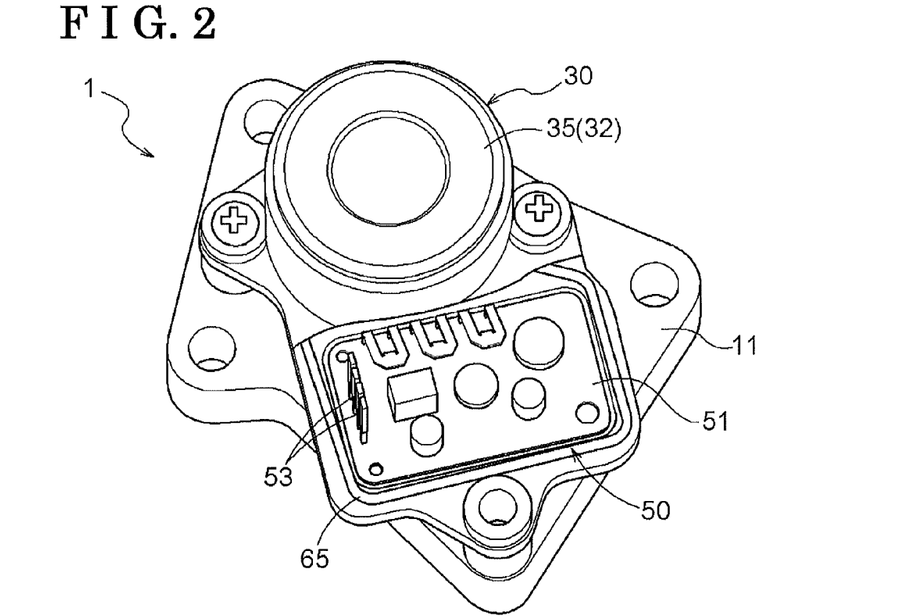
FIG. 2 is a perspective view of the electric pump according to the first embodiment in a state where a motor housing is cut and removed.
Figure 3:
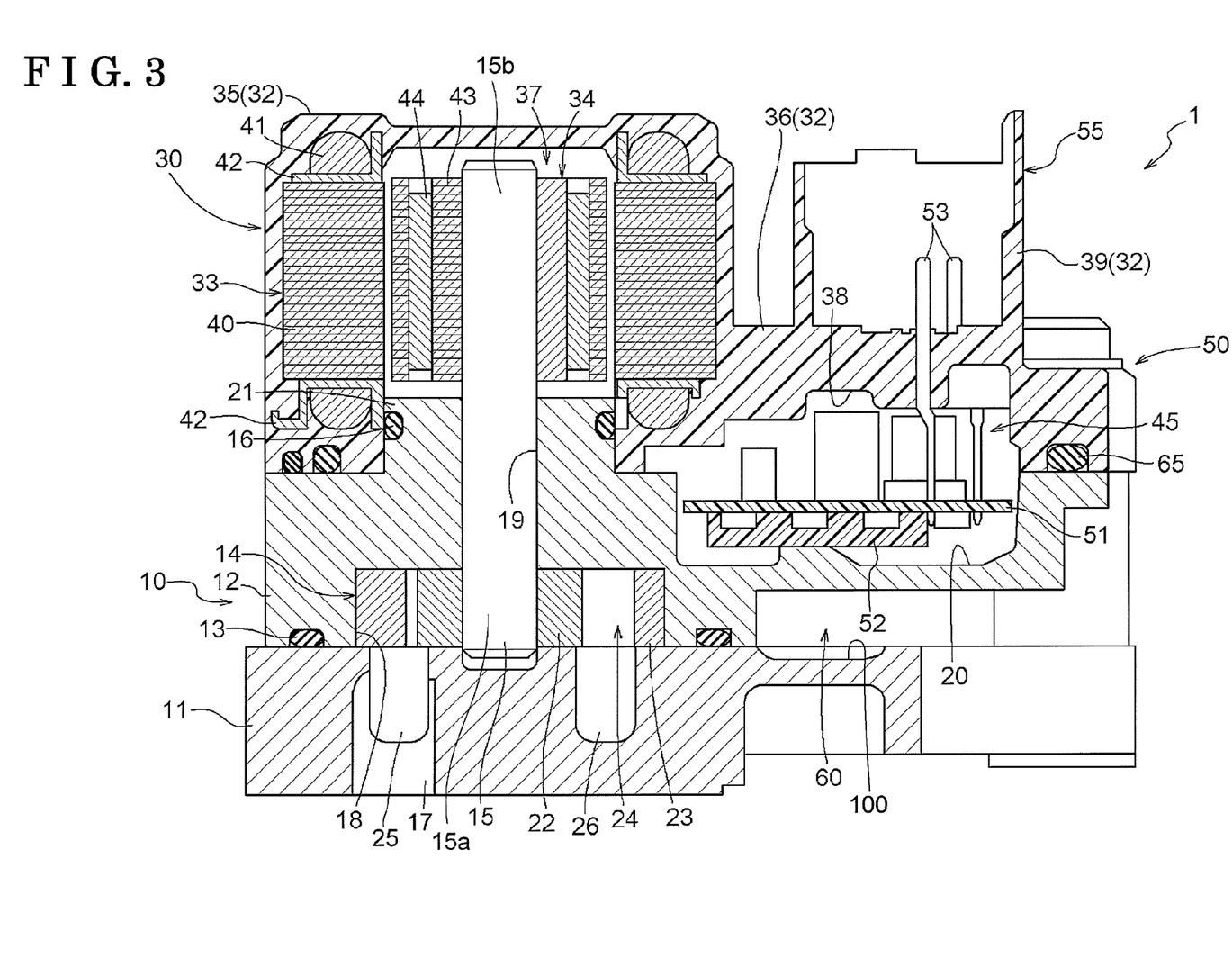
FIG. 3 is a cross-sectional view of the electric pump according to the first embodiment taken along line III-III in FIG. 1.

An electric pump 1 according to a first embodiment will be described referring to drawings. FIG. 1 is a top view of the electric pump 1. FIG. 2 is a perspective view of the electric pump 1 in a state where a driver attaching portion 36 that houses, or covers, a driver portion 50 is cut and removed from the electric pump 1. FIG. 3 is a cross-sectional view of the electric pump 1 in FIG. 1 taken along line III-III. As FIG. 3 illustrates, the electric pump 1 mainly includes a pump portion 10, a motor portion 30, and the driver portion 50. The pump portion 10 includes a pump housing 12 and a pump cover 11. The pump housing 12 is provided with a recessed portion 18, which is a circular recess, formed at one end. The pump cover 11 provides a covering for an end surface where the recessed portion 18 of the pump housing 12 is provided. The pump cover 11 covers the end surface of the pump housing 12 in a liquid-tight manner by a first sealing member 13 provided between the pump housing 12 and the pump cover 11. Each of the pump housing 12 and the pump cover 11 is made from an aluminum alloy, or a similar material. The pump housing 12 is provided with a bearing through-hole 19 provided at an off-centered position from the center of the recessed portion 18. A rotation shaft 15 is inserted into the bearing through-hole 19. The rotation shaft 15 is rotatably supported by the bearing through-hole 19.

A pump operating portion 14 arranged in the recessed portion 18 includes an inner rotor 22 formed with external teeth and an outer rotor 23 formed with internal teeth that gear with the external teeth of the inner rotor 22. An outer peripheral surface of the outer rotor 23 is retained by the recessed portion 18 in a state such that the outer rotor 23 freely rotate thereat. The inner rotor 22 is press fit to and fixed at a first side portion 15a of the rotation shaft 15 such that the inner rotor 22 and the rotation shaft 15 share a same axis. A second side portion 15b, which is an end of the rotation shaft 15 provided at the opposite side of where the inner rotor 22 is fixed to and retained, project out from an end surface of an protruding portion 21 formed in a cylinder form.

Between the tooth portions of the inner rotor 22 and the tooth portions of the outer rotor 23, the tooth portions that gear with each other, a multiple number of pump operating chambers 24, each of which increases and decreases a volume to contain thereat in accordance with the rotation of the rotors. On an inner surface of the pump cover 11 that corresponds to the pump operating chambers 24, an intake chamber 25 and a discharge chamber 26 are formed. The intake chamber 25 is formed along the area where the volume to contain in the pump operating chambers 24 increases. The discharge chamber 26 is formed along the area where the volume to contain in the pump operating chambers 24 decreases. The pump cover 11 is formed with an intake port 17 that is communicated with the intake chamber 25 and a discharge port that is communicated with the discharge chamber 26.

At a radially outward portion of the pump housing 12, on a surface opposite of the surface where the recessed portion 18 is formed, a downside recess 20 is formed. The downside recess 20 is a portion of the driver containing portion 45 that contains, or accommodates, the driver portion 50 that drives the motor portion 30. A thickness at a bottom side of the downside recess 20 is unevenly provided in a state where at least a portion of the bottom side of the downside recess 20 being thinner than other portions. The portion being thinner than other portions, which is a portion between the pump housing 12 and the pump cover 11, is provided as a result of providing a heat release space 60 for releasing heat generated at the driver portion 50. The heat release space 60 is provided on the surface of the pump housing 12 where the recessed portion 18 is formed by forming the surface in a recessed form. From a viewpoint of releasing heat effectively, the bottom side of the downside recess 20 to a whole span being formed thin is favorable. The pump cover 11 is formed with a spaced portion 100 that increases a distance between the pump cover 11 and the pump housing 12, which in other words is the distance between the pump cover 11 and the driver containing portion 45, to increase the size of the heat release space 60. In the electric pump 1 according to the first embodiment, the spaced portion 100 is formed on the pump cover 11, however, the spaced portion 100 may be formed on the pump housing 12, which is where the driver containing portion 45 is provided, or may be formed on each of the pump cover 11 and the pump housing 12.

A sensorless brushless DC motor of the motor portion 30 includes a stator 33 formed in an annular form and a rotor 34 formed in a cylinder form at a position inward of the stator 33 with a small clearance between the rotor 34 and the stator 33. Each of the stator 33 and the rotor 34 shares the same rotation axis with the rotation shaft 15. As FIG. 3 illustrates, the rotor 34 is formed by embedding and fixing a magnet 44 in a rotor yoke 43 formed in a cylinder form formed by electromagnetic steel sheets in layers. The rotor 34 is press fit and fixed to the second end 15*b*, which is an end of the rotation shaft 15 provided at the opposite side of where the inner rotor 22 is fixed.

The stator 33 includes a stator core 40 formed by the electromagnetic steel sheets in layers and coils 41 wound around coil retaining frames 42. The stator 33 is covered by a stator sealing portion 35, which is a portion of the motor housing 32 that is made of resin and formed integrally with the stator 33. A tubular space 37 with an end being closed is formed at an inner peripheral portion of the stator 33. An inner peripheral portion of the stator core 40 may be exposed to the tubular space 37 or may be covered with a thin layer of resin of the stator sealing portion 35.

The rotor 34 and the stator 33 are facing each other in the tubular space 37. An outer peripheral surface of the protruding portion 21 faces the tubular space 37. A small clearance is provided between the outer peripheral surface of the protruding portion 21 and the tubular space 37. A groove is formed on the outer peripheral surface of the protruding portion 21 and a second sealing member 16 is attached to the groove. The second sealing member 16 seals the clearance between the tubular space 37 and the protruding portion 21. The second sealing member 16 prevents oil penetrated into the tubular space 37 from flowing out to an outside of the electric pump 1 or to the driver portion 50.

The motor housing 32 includes a driver attaching portion 36, which is a portion extending in a radially outward direction of the motor portion 30 from the stator sealing portion 35. On a surface of the driver attaching portion 36, which is the surface on the same side where the tubular space 37 is formed, an upper side recess 38 is formed. In a state where the pump housing 12 and the motor housing 32 fit together, the driver containing portion 45 is formed, which is a closed space including the upper side recess 38 and the downside recess 20 facing each other.

The driver portion 50 is a circuit board 51 mounted with components, for example, a condenser, a comparator and a switching element. Hereinafter, a surface of the circuit board 51 facing the driver attaching portion 36 is referred to as an upper surface of the circuit board 51 and the surface of the circuit board 51 on the opposite side is referred to as a downward surface of the circuit board 51, with reference to FIG. 3. The circuit board 51 is fixed to the driver attaching portion 36 by screws, or similar method, at a multiple number of projections formed integrally with the driver attaching portion 36 provided for attaching the circuit board 51. An end portion of the coil 41 is exposed at a portion within the upper side recess 38 of the driver containing portion 45. Fixing the circuit board 51 to the driver attaching portion 36 is advantageous in concentrating electrical parts, which are the motor portion 30 and the driver portion 50, to a proximity of the motor housing 32. Accordingly, assembly of electrical parts, for example, electrically connecting the end portion of the coil 41 and the circuit board 51, and inspection of electrical parts after the assembly becomes easy.

The circuit board 51 is mounted with components on each of the upper surface and the downward surface. The downward surface of the circuit board 51 is mounted with relatively short chips having substantially unique heights. The upper surface of the circuit board 51 is mounted with discrete parts having relatively tall heights. A clearance larger than the height of the chips mounted is provided between the downward surface of the circuit board 51 and the bottom surface of the downside recess 20 formed on the pump housing 12. A heat release sheet 52 is inserted into a space formed by the clearance.

The heat release sheet 52 is made from a silicone base viscoelastic body, which has higher thermal conductivity than air. The heat release sheet 52 is in contact with chips mounted on the driver portion 50 and in contact with the bottom surface of the downside recess 20 formed on the pump housing 12 at the same time. Accordingly, the heat generated at the driver portion 50 is efficiently transmitted to the pump housing 12 via the heat release sheet 52. A large amount of heat transmitted to the pump housing 12 is released to the heat release space 60. A part of the heat is released by being transmitted to an operating oil flowing from the pump housing 12 to the pump portion 10.

A multiple number of contact pins 53 made from metals for providing power supply, control signals, and the like, to the driver portion 50 projects upward from the circuit board 51. The contact pins 53 are electrically connected to the circuit board 51. The contact pins 53 project into the contact housing 39, which is integrally formed with the motor housing 32. The contact pins 53 and the contact housing 39 together forms the connector 55.

As described above, the driver containing portion 45 is formed by the pump housing 12, which is a part of the pump portion 10, and the motor housing 32, which is a part of the motor portion 30. In other words, the driver containing portion 45 is provided by utilizing a space between the pump portion 10 and the motor portion 30, which results in making the electric pump 1 compact. An area indicated by a dotted line in FIG. 1 indicates the circuit board 51 of the driver portion 50. Accordingly, the driver portion 50 is fixed to the driver attaching portion 36 in a state where a portion of the driver portion 50 overlaps with the stator sealing portion 35 when viewed in the axial direction of the rotation shaft 15. By forming the driver containing portion 45 at a space between the pump portion 10 and the motor portion 30, the driver containing portion 45 may be provided close to the pump portion 10 or the motor portion 30 so that the electric pump 1 may be reduced in size.

As FIG. 2 illustrates, a gasket 65 is arranged in a state where the gasket 65 surrounds the driver portion 50 and the rotor 34. Upon the arrangement of the gasket 65 described herewith, an entry of fluid into the driver portion 50 and the rotor 34 from outside is prevented. Inserting the gasket 65 into a groove formed on a surface of the motor housing 32 that faces the pump housing 12 provides the gasket 65 at a certain position. Upon the arrangement described herewith, a single gasket serves the purpose of preventing the entry of fluid into the driver portion 50 and the rotor 34 from outside so that a number of gaskets provided to the electric pump 1 may be restrained from increasing.

As FIG. 1 illustrates, the motor housing 32, the pump housing 12 and the pump cover 11 are connected to form an integral unit by tightening bolts, or a similar method. The bolts are inserted from the motor housing 32, through the pump housing 12 and to the pump cover 11 at three locations, which are at opposing ends of the motor portion 30 in a radial direction and at a distant end portion of the driver portion 50 relative to the motor portion 30. By integrally connecting the motor housing 32, the pump housing 12 and the pump cover 11 accordingly, the driver portion 50 may be retained with a sufficient strength even in a state where the driver portion 50 is formed outward of the motor portion 30 and formed with the heat release space 60.

The electric pump 1 receives vibrations from vibration sources at the pump cover 11. The vibrations received at the pump cover 11 is transmitted to the driver portion 50 retained to the driver containing portion 45 formed by the motor housing 32 and the pump housing 12 so that the driver portion 50 vibrates. The pump housing 12 and the pump cover 11 are made from an aluminum alloy, or a similar material. Accordingly, rigidity of each of the pump housing 12 and the pump cover 11 is high. Rigidity at the driver containing portion 45 is enhanced as a result of the motor housing 32, the pump housing 12 and the pump cover 11 being connected to form an integral unit. Accordingly, rigidity of the driver attaching portion 36, which is a part of the driver containing portion 45, increases even though the driver attaching portion 36 is made from a resin material. As a result, a large amount of vibrations from the vibration sources are restrained from being transmitted to the driver portion 50. In addition, the driver portion 50 is attached to a location close to the vibration sources so that amplitude of vibrations transmitted to the driver portion 50 is relatively small.

An operation of the electric pump 1 is described next. An electric current controlled by the driver portion 50 is applied to the coil 41 of the sensorless brushless DC motor. As a result, a revolving magnetic field is generated, which in turn rotates the rotor 34. The rotation of the rotor 34 is transmitted to the inner rotor 22 via the rotation shaft 15 so that the inner rotor 22 rotates. Accordingly, the operating oil is sucked into the pump operating chambers 24 from the intake port 17 via the intake chamber 25 and discharged from the discharge port via the discharge chamber 26. A part of the operating oil sucked into the pump operating chambers 24 is allowed to enter between the rotation shaft 15 and the bearing through-hole 19 of the pump housing 12 and then flows into the tubular space 37 while lubricating the bearing portion. Upon the arrangement described herewith, the operating oil makes contact with the stator 33 so that an efficiency of cooling the stator 33 is enhanced. The second sealing member 16 is attached between the tubular space 37 and the pump housing 12. As a result, oil that entered the tubular space 37 is prevented from flowing out of the electric pump 1 or flowing into the driver portion 50. As an alternative, an oil seal may be provided at the bearing through-hole 19 between the pump operating portion 14 and the tubular space 37 for preventing the operating oil to enter the tubular space 37.

Figure 4:
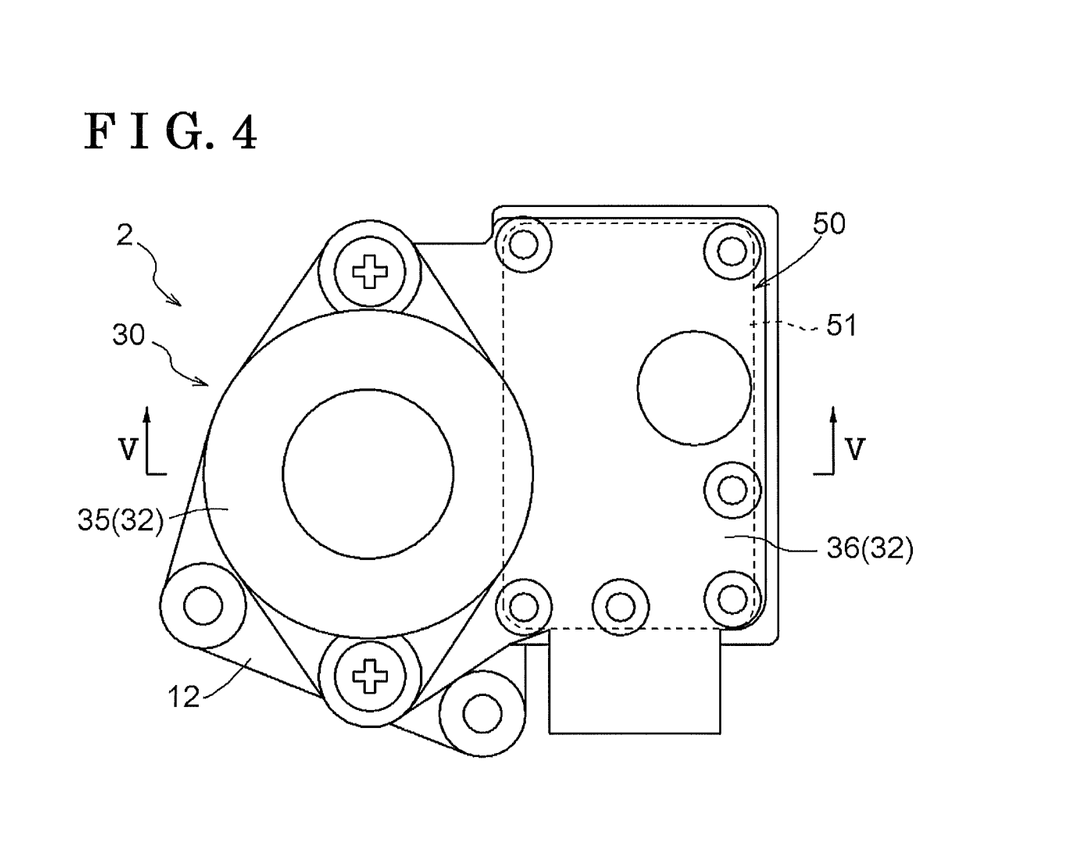
FIG. 4 is a top view of an electric pump according to a second embodiment.
Figure 5:
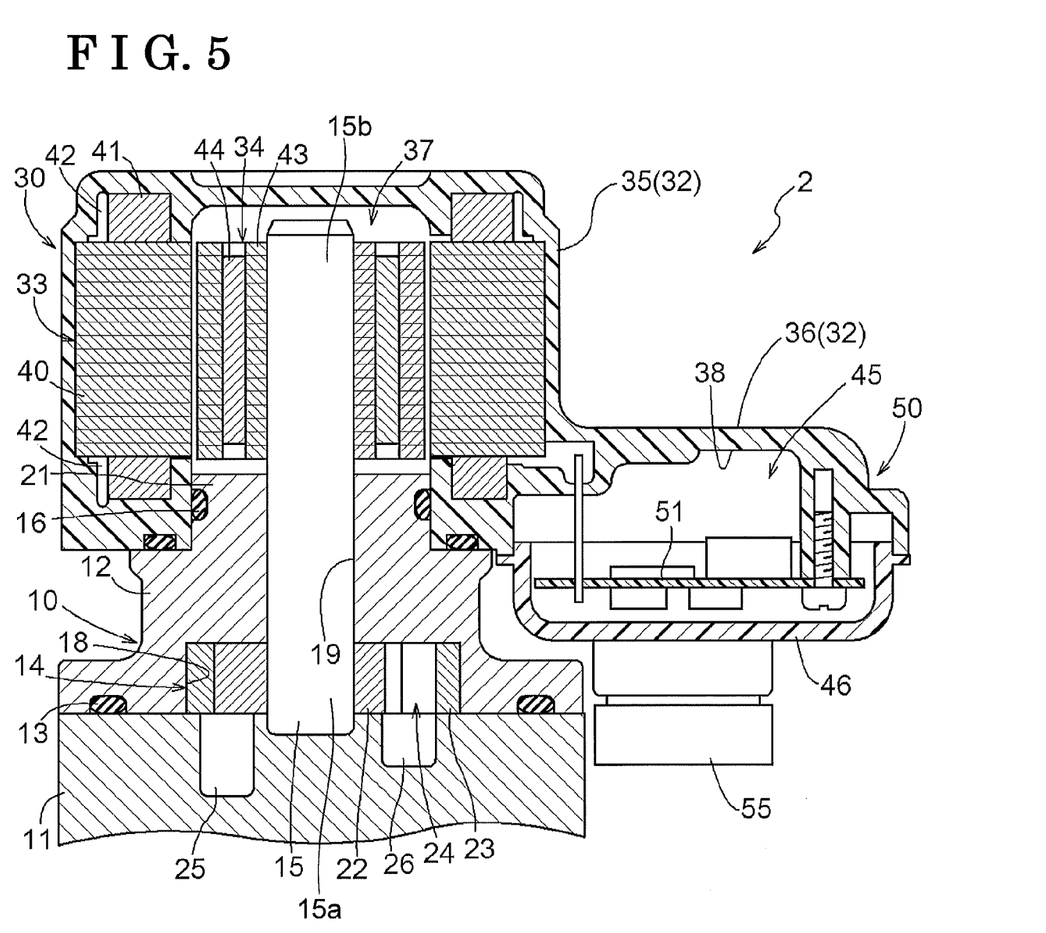
FIG. 5 is a cross-sectional view of the electric pump according to the second embodiment taken along line V-V in FIG. 4.

An electric pump 2 according to a second embodiment is described next referring to drawings. FIG. 4 is a top view of the electric pump 2 and FIG. 5 is a cross-sectional view of the electric pump 2 taken along line V-V in FIG. 4. Structures of a pump portion 10 and a motor portion 30 of the electric pump 2 are similar to the structures of the pump portion 10 and the motor portion 30 of the electric pump 1 according to the first embodiment so that descriptions in detail for each of the pump portion 10 and the motor portion 30 of the electric pump 2 are omitted.

The electric pump 2 according to the second embodiment is provided with a driver cover 46 as an independently provided part instead of the downside recess 20 formed on the pump housing 12 of the electric pump 1 according to the first embodiment. The driver cover 46 is a concave form part formed from a resin material. The driver cover 46 and a driver attaching portion 36 are joined together and sealed by adhesion, by fusion welding, or a similar method. A heat release sheet 52 is not inserted between a downward surface of the circuit board 51 and a bottom surface of the driver cover 46. Instead, a heat release performance is reliably maintained by decreasing a distance between the downward surface of the circuit board 51 and a bottom surface of the driver cover 46.

A pump cover 11 of the electric pump 2 according to the second embodiment is formed such that the pump cover 11 faces the pump housing 12 of the pump portion 10 and does not extend up to outward portion of the driver portion 50. The driver containing portion 45 is solely retained by the motor housing 32. The arrangement described herewith is allowed as long as reliability for performances of, for example, withstanding vibration and heat resistance may be reliably maintained. Accordingly, the electric pump 2 may be reduced in size as a whole, which results in simultaneously reducing weight.

The electric pump 1, 2 according to this disclosure is applicable as the electric pump including a fluid pump, an electric motor driving the fluid pump, and a driver being integrated into a unit.

According to an aspect of this disclosure, the electric pump 1, 2 includes the pump portion 10, the motor portion 30 including the rotor 34 formed in the cylinder form sharing the axis with the rotation shaft 15 provided at the pump portion 10 and the stator 33 formed in the annular form arranged at the outer periphery of the rotor 34 with a clearance between the stator 33 and the rotor 34, and the driver portion 50 arranged at a position between the pump portion 10 and the motor portion 30 when viewed in a direction orthogonal to the axial direction of the rotation shaft 15, the driver portion 50 controlling the motor portion 30, the driver portion 50 arranged in a state where a portion of the driver portion 50 overlaps with at least a portion of the pump portion 10 or with at least a portion of the motor portion 30 when viewed in the axial direction.

Upon the arrangement described herewith, the driver portion 50 is arranged outward of the motor portion 30 at a position that overlaps with at least a portion of the pump portion 10 or overlaps with at least a portion of the motor portion 30 when viewed in the axial direction. Accordingly, the electric pump 1, 2 may be reduced in size as a whole.

According to another aspect of this disclosure, the electric pump 1 is characterized by the pump portion 10 including the pump housing 12, the motor portion 30 including the motor housing 32, the driver portion 50 contained in the driver containing portion 45, which is formed by the pump housing 12 and the motor housing 32, and the driver portion 50 fixed to the motor housing 32.

Upon the arrangement described herewith, the electrical parts, for example, the motor portion 30 and the driver portion 50 may be concentrated to the proximity of the motor housing 32. Accordingly, assembly of the electrical parts, for example, electrically connecting the end portion of the coil 41 of the motor portion 30 and the circuit board 51, and inspection of the electrical parts after the assembly becomes easy.

According to further aspect of this disclosure, the pump portion 10 of the electric pump 1 includes the pump cover 11 spanning from the pump portion 10 to the driver portion 50 when viewed in the axial direction. The pump cover 11 and the driver containing portion 45 of the electric pump 1 in the direction of the pump housing 12 are connected with the heat release space 60 arranged between the pump cover 11 and the driver containing portion 45.

Accordingly, the heat generated at the driver portion 50 may be efficiently released from the pump housing 12 to the heat release space 60. Upon the arrangement described herewith, the driver portion 50 may be retained with sufficient strength even in a situation where the driver portion 50 is formed outward of the motor portion 30 and the heat release space 60 is formed between the pump housing 12 and the pump cover 11.

According to another aspect of this disclosure, the electric pump 1 further includes the heat release sheet 52 provided between the driver portion 50 and the pump housing 12 that forms the driver containing portion 45 in an arrangement where the heat release sheet 52 is in contact with each of the driver portion 50 and the pump housing 12.

Accordingly, the heat generated at the driver portion 50 may be efficiently released out of the electric pump 1.

According to further aspect of this disclosure, the electric pump 1 further includes the gasket 65 arranged at an interface between the pump housing 12 and the motor housing 32. The gasket 65 is arranged in the state where the gasket 65 at least surrounds the rotor 34 and the driver portion 50.

Accordingly, a single gasket prevents the entry of fluid into the rotor 34 and the driver portion 50 from outside, which is advantageous in reducing the number of gaskets.

According to another aspect of this disclosure, the electric pump 1 is characterized by the pump portion 10 including the pump housing 12, the motor portion 30 including the motor housing 32, the driver portion 50 contained in the driver containing portion 45, which is formed by at least one of the pump housing 12 and the motor housing 32, and the heat release space 60 provided between the pump cover 11 the pump housing 12 attaches to and the driver containing portion 45.

Accordingly, the heat generated at the driver portion 50 may be efficiently released from the driver containing portion 45 to the heat release space 60.

According to further aspect of this disclosure, the spaced portion 100 of the electric pump 1 is provided on at least one of the pump cover 11 and the driver containing portion 45 to increase the heat release space 60 by increasing the distance between the pump cover 11 and the driver containing portion 45.

Accordingly, the heat generated at the driver portion 50 may be efficiently released out of the electric pump 1 by increasing the heat release space 60.

According to another aspect of this disclosure, the spaced portion 100 of the electric pump 1 is provided on at least one of the pump cover 11 and the driver containing portion 45 to increase the heat release space 60 by increasing the distance between the pump cover 11 and the driver containing portion 45.

Accordingly, the heat generated at the driver portion 50 may be efficiently released out of the electric pump 1 by increasing the heat release space 60.

According to further aspect of this disclosure, the electric pump 1, 2 includes the pump portion 10 connected to the first end 15a of the rotation shaft 15, the motor portion 30 including the rotor 34 connected to the second end 15b of the rotation shaft 15 and the stator 33 formed in the annular form arranged at the outer periphery of the rotor 34 with a clearance between the stator 33 and the rotor 34, and the driver portion 50 arranged at the position between the pump portion 10 and the motor portion 30 in the axial direction of the rotation shaft 15, the driver portion 50 controlling the motor portion 30. At least a portion of the driver portion 50 is either arranged radially inward of the pump portion or radially inward of the motor portion in the radial direction of the rotation shaft 15.

Accordingly, the electric pump 1, 2 may be reduced in size as a whole. Connecting the pump portion 10 at the first end 15a of the rotation shaft 15 and the rotor 34 at the second end 15b of the rotation shaft 15 and providing a bearing portion at a portion between the pump portion 10 and the rotor 34 restrains the electric pump 1, 2 from increasing size relative to providing the bearing portion at an end portion further toward an end of the rotation shaft 15 relative to the pump portion 10 or at an end portion further toward an end of the rotation shaft 15 relative to the rotor 34. A structure provided with the bearing portion at the end portion further toward the end of the rotation shaft 15 relative to the pump portion 10 or at the end portion further toward the end of the rotation shaft 15 relative to the rotor 34 requires a relatively long bearing portion in the axial direction of the rotation shaft 15 in order to restrain misalignments of axises of the rotation shaft 15, the pump portion 10 and the rotor 34. Accordingly, the electric pump 1, 2 provided with the driver portion 50 at a portion in the axial direction of the rotation shaft 15 where the bearing portion is arranged reduces the size of the electric pump 1, 2 as a whole.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An electric pump, comprising:
a pump portion including a pump housing;
a motor portion including a motor housing, a rotor formed in a cylinder form sharing an axis with a rotation shaft provided at the pump portion, and a stator formed in an annular form arranged radially outward at an outer periphery of the rotor with a clearance between the stator and the rotor; and
a driver portion arranged at a position between the pump portion and the motor portion when viewed in a direction orthogonal to an axial direction of the rotation shaft, the driver portion controlling the motor portion, the driver portion arranged in a state where a portion of the driver portion overlaps with at least a portion of the pump portion or with at least a portion of the motor portion when viewed in the axial direction, the driver portion being other than coaxial with the pump portion and being other than coaxial with the motor portion, wherein
the motor housing includes a stator sealing portion and a driver attaching portion, the stator sealing portion is formed integrally with the stator, and the driver attaching portion extends in a radially outward direction of the motor portion from a radially outer portion of the stator sealing portion,
the driver portion is contained in a driver containing portion formed by the pump housing and the motor housing,
the driver portion includes a circuit board that is fixed to the driver attaching portion of the motor housing, and
the driver attaching portion being an upper side portion of the driver containing portion.

2. The electric pump according to claim 1, wherein
the pump portion includes a pump cover spanning from the pump portion to the driver portion when viewed in the axial direction, and wherein
the pump cover and the driver containing portion in a direction of the pump housing are connected with a heat release space arranged between the pump cover and the driver containing portion.

3. The electric pump according to claim 2, further comprising:
a heat release sheet provided between the driver portion and the pump housing that forms the driver containing portion in an arrangement where the heat release sheet is in contact with each of the driver portion and the pump housing.

4. The electric pump according to claim 1, further comprising:
a gasket arranged at an interface between the pump housing and the motor housing,
wherein the gasket is arranged in a state where the gasket at least surrounds the rotor and the driver portion.

5. The electric pump according to claim 1, wherein
a heat release space is provided between a pump cover attached to the pump housing and the driver containing portion.

6. The electric pump according to claim 2, wherein a spaced portion is provided on at least one of the pump cover and the driver containing portion to space the pump cover from the driver containing portion to facilitate heat release.

7. The electric pump according to claim 5, wherein a spaced portion is provided on at least one of the pump cover and the driver containing portion to space the pump cover from the driver containing portion to facilitate heat release.

8. The electric pump according to claim 1, wherein the driver attaching portion is integrally formed in one piece as a unitary part of the stator sealing portion.

9. An electric pump, comprising:
a pump portion including a pump housing, the pump portion connected to a first side portion of a rotation shaft;
a motor portion including a motor housing and including a rotor connected to a second side portion of the rotation shaft and a stator formed in an annular form arranged radially outward at an outer periphery of the rotor with a clearance between the stator and the rotor; and
a driver portion arranged at a position between the pump portion and the motor portion in an axial direction of the rotation shaft, the driver portion controlling the motor portion, the driver portion being other than coaxial with the pump portion and being other than coaxial with the motor portion, wherein
at least a portion of the driver portion is either arranged radially inward of a portion of the pump portion or radially inward of a portion of the motor portion in a radial direction of the rotation shaft,
the motor housing includes a stator sealing portion and a driver attaching portion, the stator sealing portion is formed integrally with the exterior of the stator, and the driver attaching portion extends in a radially outward direction of the motor portion from a radially outer portion of the stator sealing portion,
the driver portion is contained in a driver containing portion formed by the pump housing and the motor housing,
the driver portion includes a circuit board that is fixed to the driver attaching portion of the motor housing, and
the driver attaching portion being an upper side portion of the driver containing portion.

* * * * *